United States Patent

Yoshimura et al.

[11] 3,972,604
[45] Aug. 3, 1976

[54] SOUND-RECORDING MOTION-PICTURE CAMERA

[75] Inventors: Hirofumi Yoshimura; Toyonori Higuma; Noriaki Itoo, all of Tokyo, Japan

[73] Assignee: Kabushiki Kaisha Yashica, Tokyo, Japan

[22] Filed: Sept. 30, 1974

[21] Appl. No.: 510,557

[30] Foreign Application Priority Data

Oct. 1, 1973  Japan............................ 48-109319

[52] U.S. Cl................................ 352/14; 352/91 C
[51] Int. Cl.²......................................... G03B 31/00
[58] Field of Search............... 352/14, 91 R, 91 C, 352/91 S

[56] References Cited
UNITED STATES PATENTS

| | | | |
|---|---|---|---|
| 1,844,672 | 2/1932 | Narath | 352/91 C |
| 2,982,172 | 5/1961 | Berkenhoff | 352/14 |
| 3,244,469 | 4/1966 | Hennessey | 352/14 |
| 3,492,068 | 1/1970 | Baron | 352/12 |
| 3,597,056 | 8/1971 | Sasaki | 352/14 |
| 3,746,453 | 7/1973 | Kotler | 352/14 X |

Primary Examiner—Monroe H. Hayes
Attorney, Agent, or Firm—Steinberg and Blake

[57] ABSTRACT

A motion-picture camera having exposure and sound-recording structures past which the film is transported by a pair of film-transporting structures, respectively, at least one of which is driven by a variable speed electric motor. The film is transported both forwardly and rearwardly and forms between the exposure and sound-recording structures a loop from which the film is continuously transported to the sound-recording structure and to which the film is transported in a stepwise manner from the exposure structure. A detecting device detects when this film loop becomes longer or shorter than a predetermined magnitude, and through a suitable circuit this detecting device is connected with the variable speed motor for controlling the speed thereof so as to increase the length of the film loop when it becomes shorter than the predetermined magnitude and decrease the length of the film loop when it becomes longer than the predetermined magnitude, so that in this way the film loop is maintained at the predetermined magnitude. The components referred to above operate both during forward as well as rearward travel of the film so that it is necessary to displace components of the sound-recording structure away from the film during rearward travel of the latter.

7 Claims, 10 Drawing Figures

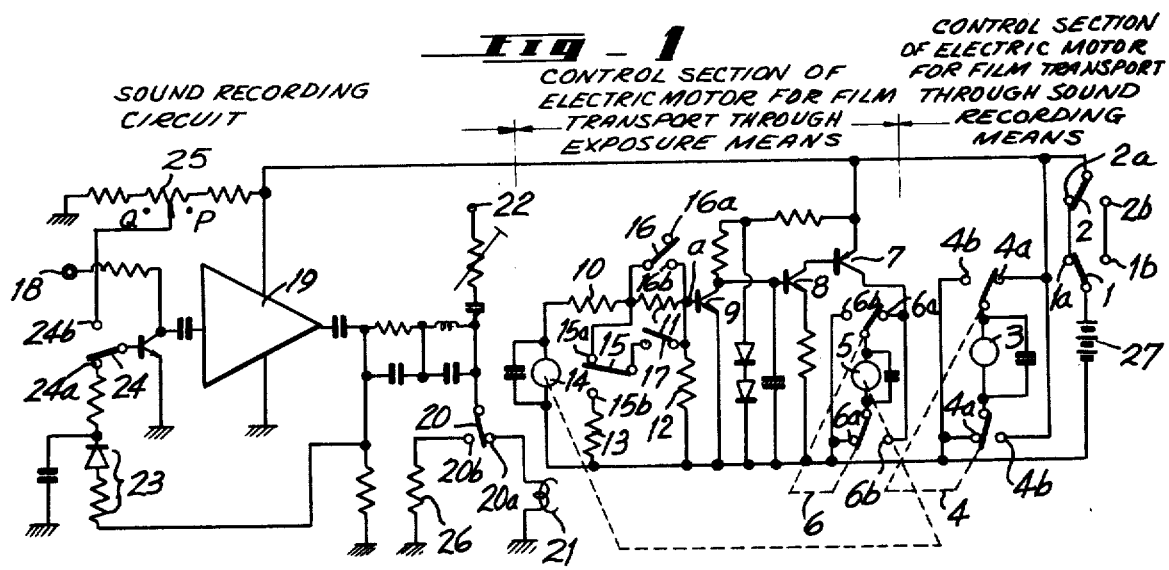
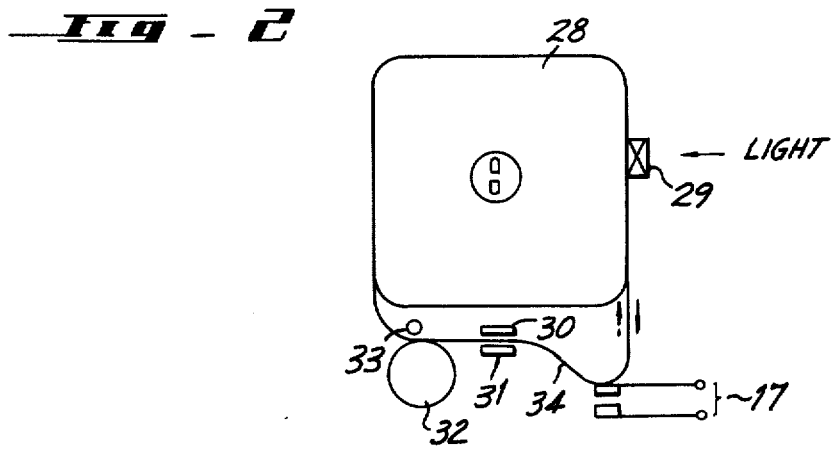
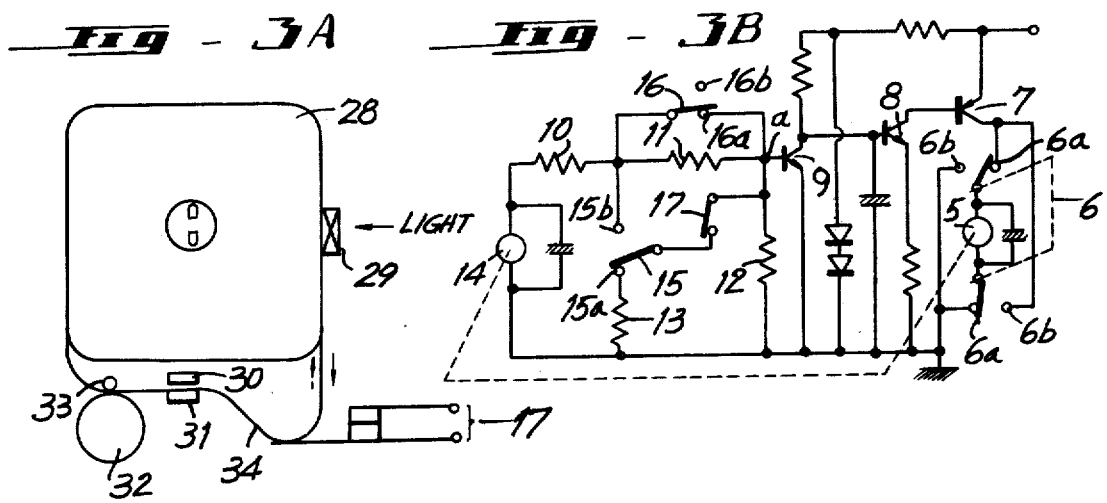

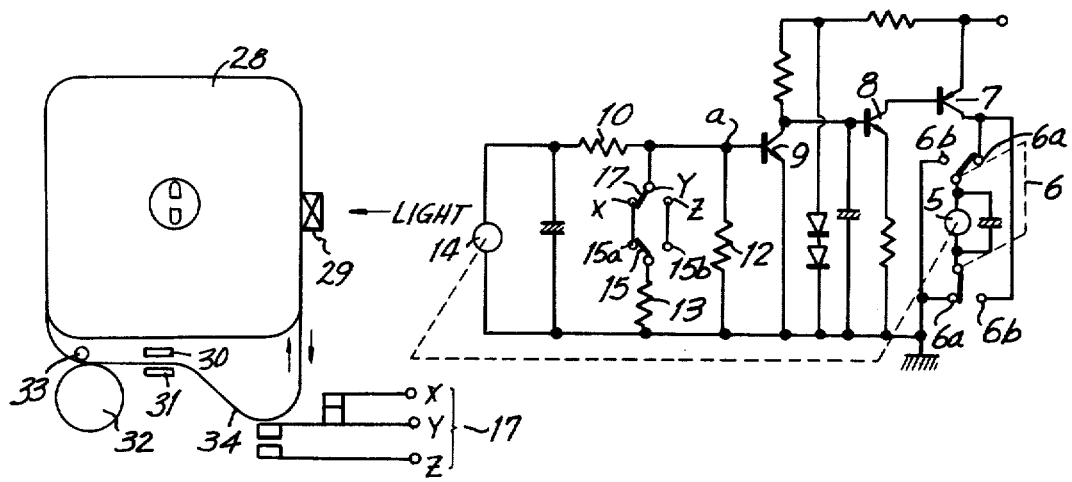
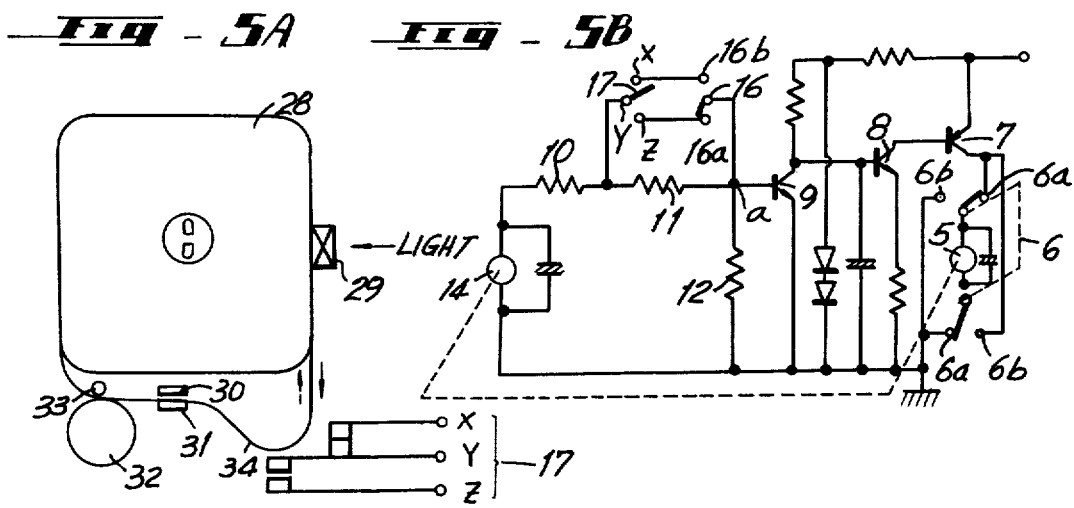
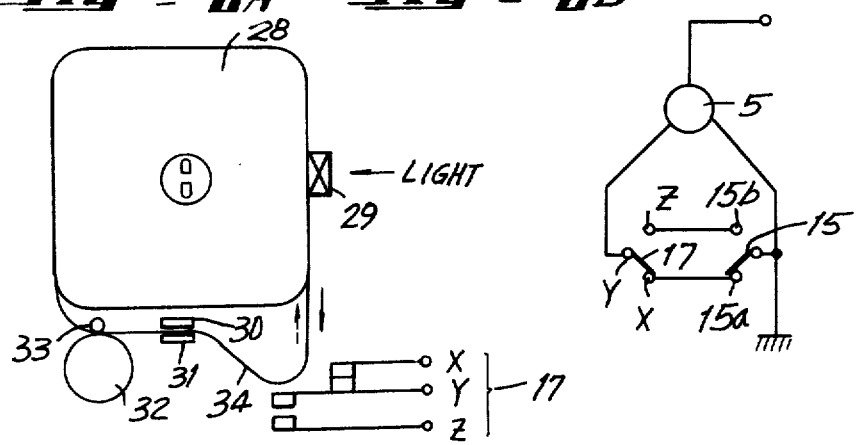

SOUND-RECORDING MOTION-PICTURE CAMERA

BACKGROUND OF THE INVENTION

The present invention relates to motion picture cameras which are capable of recording sound on a sound track of film which is exposed in the camera.

Cameras of the above type have recently been manufactured in relatively small sizes, the film which is used with such cameras usually being provided with a magnetic sound-recording track. A sound-recording means records sound on this track and is situated at a predetermined distance from an exposure means where the film is exposed through an exposure aperture of the camera. Between the exposure means and sound recording means the film is sufficiently long to have a relaxed portion forming a film loop from which the film can travel continuously past the sound-recording means while the film is fed intermittently in a stepwise manner to the film loop from the exposure means. For this purpose the film loop has a length which usually corresponds to 1–4 frames. A film loop on the order of this latter length is suffiently long so that the intermittent, stepwise transportation on the film by the claw mechanism, for the purpose of exposing the flim, is effectively absorbed at the film loop, enabling the film to be transported continuously past the sound-recording head at a constant velocity.

With motion-picture cameras of this type, it is necessary to carry out special procedures in order to provide overlapping fade-in and fade-out portions. These special procedures require the film to be transported rearwardly with respect to the sound-recording mechanism which includes film-engaging components such as a capstan, a pinch roller, and a head pad. Conventionally it is essential to displace components of this latter type away from the path of travel of the film during rearward or rewinding movement thereof. This necessity of displacing sound-recording components away from the film when the latter is rearwardly transported is a considerable disadvantage inasmuch as the structure is rendered exceedingly complex because of the requirement of displacing these sound-recording components away from the film during rewinding thereof and then back toward the film during forward travel thereof. With conventional motion-picture cameras of the above type during the rearward transport of the film the length of the film loop changes undesirably if the above sound-recording components are not displaced away from the film, so that problems in connection with possible damage prevent a smooth rearward transport of the film unless the sound-recording components which engage the film during forward transport thereof are displaced away from the film during rearward transport thereof.

SUMMARY OF THE INVENTION

It is accordingly a primary object of the present invention to provide a motion-picture camera which will avoid the above problems.

In particular, it is an object of the present invention to provide a motion-picture camera which does not require sound-recording components to be displaced away from the film during rearward travel thereof.

Thus, it is an object of the present invention to achieve a smooth rearward transport of the film, without displacing sound-recording components away from the film, while at the same time maintaining the film loop at a predetermined magnitude during rearward transport as well as forward transport of the film.

It is also an object of the present invention to provide a relatively simple structure which will operate reliably to achieve the above objects in a fully automatic manner.

According to the invention the sound-recording motion-picture camera includes an exposure means for exposing film as the latter is fed frame-by-frame in a stepwise manner past the exposure means. A sound-recording means receives the film from the exposure means and records sound on a sound track of the film while the latter travels continuously past the sound-recording means. A pair of film-transporting means cooperate with the film for transporting the latter in a stepwise manner past the exposure means and in a continuous manner past the sound-recording means, respectively, while forming between the exposure means and the sound-recording means a length of film sufficiently long to provide at a predetermined location a film loop from which the film is fed continuously to the sound-recording means and to which the film is fed in a stepwise manner from the exposure means. At least one of the above film-transporting means includes a variable speed motor which controls the speed with which the film is transported by this one film-transporting means. A detecting means is provided at the above predetermined location for detecting when the film loop becomes longer or shorter than a predetermined magnitude. Through a suitable circuit means this detecting means is electrically connected with the above variable speed motor for controlling the speed of operation thereof in order to decrease the length of the film loop when it becomes longer than the above predetermined magnitude and increase the length of the film loop when it becomes shorter than the above predetermined magnitude. These operations take place both during forward and rearward travel of the film so that it becomes unnecessary to construct the sound-recording means in such a way that components thereof which engage the film during forward movement of the film must be displaced away from the film during rearward movement thereof.

BRIEF DESCRIPTION OF DRAWINGS

The invention is illustrated by way of example in the accompanying drawings which form part of this application and in which:

FIG. 1 is a wiring diagram illustrating a circuitry suitable for one embodiment of the invention;

FIG. 2 is a schematic illustration of the manner in which film travels with respect to a cartridge past the exposure means and sound-recording means;

FIG. 3A shows a construction similar to FIG. 2 except that the detecting means of FIG. 3A is constructed differently from the detecting means of FIG. 2;

FIG. 3B illustrates how the circuitry of FIG. 1 is modified so as to cooperate with the detecting means of FIG. 3A;

FIG. 4A shows a further embodiment of a detecting means cooperating with a film loop;

FIG. 4B illustrates the circuitry which cooperates with the detecting means of FIG. 4A;

FIG. 5A shows yet another embodiment of a detecting means for detecting changes in the magnitude of a film loop;

FIG. 5B illustrates an electrical circuit for cooperating with the switch means of FIG. 5A;

FIG. 6A shows a detecting means identical with that of FIG. 5A cooperating in the same way with a film loop; and FIG. 6B illustrates how the detecting means of FIG. 6A is electrically connected with a variable speed motor according to a further embodiment of the invention.

DESCRIPTION OF PREFERRED EMBODIMENTS

FIG. 1 illustrates part of the electrical circuitry of a relatively small sound-recording motion picture camera. The right section of the circuitry of FIG. 1 is designated as a control section of the electric motor for film transport through the sound-recording means. The intermediate section of the circuitry of FIG. 1 is designated as a control section of the electric motor for film transport through the exposure means. The left section of the circuitry of FIG. 1 represents sound-recording circuitry.

At the right of FIG. 1 is shown a switch 1 which is available for starting and stopping the camera, this switch 1 being a release switch operatively associated with a release button or plunger which is actuated to start and stop exposure of film. Normally the switch 1 engages the contact contact terminal 1b, while when the operating plunger is depressed the switch 1 is transferred into engagement with the terminal 1a.

The terminals 1a and 1b are electrically connected with terminals 2a and 2b of a switch 2 which operates to change the direction of rotation of motors 3 and 5, referred to below, so that these motors can be operated either to transport the film forwardly or to transport the film rearwardly. When the change-over switch 2 engages terminal 2a, forward transportation of the film is effected, with the motors 3 and 5 rotating forwardly, at this time, while when the switch 2 engages the terminal 2b, the motors 3 and 5 will rotate in the opposite direction and rearward or rewinding travel of the film will be brought about. This switch 2 is electrically connected with further switches which also participate in the change-over between forward and rearward drive.

A film-transporting means is provided for transporting the film past a sound-recording means which is referred to below, and this film-transporting means includes the reversible electric motor 3. This reversible electric motor 3 drives the capstan 33 which is indicated in FIG. 2 and which is rotated by the motor 3 at a constant velocity.

The circuit which is connected with the reversible motor 3 includes a switch 4 having the pairs of terminals 4a and 4b as illustrated. This switch 4 also contributes to the determination of the direction of rotation of the motor 3. When the switch 4 is closed at its contacts or terminals 4a, the motor 3 rotates in a direction which transports the film forwardly, while when the switch 4 is closed at its terminals 4b, rearward travel of the film with respect to the sound-recording means will be effected.

A second film-transporting means is provided for transporting the film past an exposure means which, as schematically shown in FIG. 2, includes the assembly 29 in the form of a suitable objective and adjustable diaphragm which determines the size of the exposure aperture. This latter film-transporting means includes the reversible variable speed electric motor 5 which operates a conventional claw mechanism which serves to feed the film intermittently in a stepwise manner past the exposure means 29 so as to expose the film frame-by-frame during its stepwise transportation by the transporting means which includes the electric motor 5. A switch 6 cooperates with the electric motor 5 for participating in the determination of the direction of rotation thereof. This switch 6 includes the pair of terminals 6a and the pair of terminals 6b. When the switch 6 is closed at its terminals 6a the motor 5 rotates in the direction which will provide for forward feeding of the film while when the switch 6 is closed at its terminals 6b, the direction of the motor 5 is reversed and rearward movement of the film in the rewinding direction takes place.

The control of the speed of the motor 5, in both directions of rotation thereof, includes a circuit means which has a transistor 7 for current amplification, this transistor 7 being included in the circuit which energizes the motor 5. The transistor 7 receives an input from a two-stage amplification circuit consisting of the transistors 8 and 9 which operate in a manner described below to control the current of the electric motor 5. This transistor 9 is selectively operated with a bias voltage determined by a resistor means which includes the resistors 10, 11, 12, and 13, as well as a generator 14. The circuit means which includes the biasing resistor means 10-13 also includes change-over switches 15 and 16. The switch 15 includes terminals 15a and 15b, with the switch 15 being closed at its terminal 15a during forward transportation of the film and at its terminal 15b during rearward transportation of the film. In the same way the switch 16 has terminals 16a and 16b. These terminals 16a and 16b are respectively engaged by the blade of the switch 16 during forward and rearward travel of the film. A detecting means, which is referred to in greater detail below, is formed by the switch 17 which is connected between the switch 15 and the resistor 12 in the manner shown in FIG. 1. The switch 17 operates in such a way, as described in greater detail below, that when a film loop exceeds a predetermined magnitude the switch 17 automatically closes while when the film loop is less than this predetermined magnitude the switch 17 automatically opens. During forward movement of the film, when the switch 17 closes the illustrated circuit means operates on the motor 5 to decelerate the latter while upon opening of the switch 17 during forward movement of the film, the illustrated circuit means operates on the electric motor 5 to accelerate the latter.

The sound-recording circuitry is conventional except that the volume of the sound which is recorded is progressively reduced during a fade-out operation and increased during a fade-in operation. Moreover the recording of sound is interrupted during rearward travel of the film. This latter interruption in the recording of the sound is brought about by interrupting an input circuit to the sound-recording head of the sound-recording means.

At the left of FIG. 1 is shown a terminal 18 to which an audio signal is supplied by way of a sound-recording microphone which is connected to the terminal 18. This signal which is received by the terminal 18 is amplified by a sound-recording amplifier 19, and then the signal is AC biased and applied through a change-over switch 20 to a sound-recording head 21. An AC oscillator is electrically connected to a terminal 22. An automatic control of sound volume is achieved by the control circuit 23, this circuit including a change-over switch 24 capable of being displaced so as to change its position depending upon whether normal photography and sound recording is going forward or whether a fade-in or fade-out operation is taking place. When the switch 24 engages the terminal 24a, as illustrated in FIG. 1, there is an automatic control of the volume of sound during normal exposure of the film. However, when the switch 24 engages its terminal 24b, it is connected to a variable resistor 25 having a slidable tap which controls the resistance value for controlling the audio signal. Preferably the variable resistor 25 is operatively connected with the movable shutter member which increases or decreases the angle of opening at the rotary shutter of the camera, as is well known, so that in response to increase or decrease in the latter angle of the shutter the variable resistor 25 will be operated to increase or decrease the volume of the sound.

The switch 20, when engaging its teminal 20a, completes a circuit to the illustrated sound-recording head 21 while during rearward travel of the film the switch 20 engages its contact 20b so that the input to the sound-recording head 21 is interrupted in this way during rearward travel of the film. Thus the sound-recording means will be rendered inoperative to record sound during rearward transport of the film. The terminal 20b may be connected with a resistor 26, if desired, this resistor 26 being connected into the circuit for stabilization purposes when the switch 20 is changed over to the contact 20b. The illustrated circuitry also includes a battery 27.

With the exception of the switch 24, the switch 17, and the switch 1, all of the remaining switches shown in FIG. 1 may be ganged together so as to be simultaneously displaced either into engagement with those terminals designated with reference characters ending in a or those terminals designated with the reference characters ending in b. Thus, during forward travel of the film, the switches 2, 4, 6, 15, 16, and 20 respectively engage the terminals 2a, 4a, 6a, 15a, 16a, and 20a, while during rearward travel of the film all of these switches respectively engage their terminals 2b, 4b, 6b, 15b, 16b, and 20b.

FIG. 2 schematically illustrates a film cartridge 28 as it is situated in the camera. The film-transporting means which includes the variable speed reversible motor 5 serves to transport the film in a stepwise manner frame-by-frame in a forward direction past the exposure means 29, as pointed out above, the motor 5 operating an unillustrated claw mechanism situated at the region of the upper right portion of the cartridge 28, as viewed in FIG. 2, for acting on the film to transport the film downwardly past the exposure means 29. As the film travels in a forward direction, illustrated by the solid downwardly directed arrow in FIG. 2, beyond the exposure means 29, the film is received by the sound-recording means which includes the rotary capstan 33, driven at a constant speed of rotation, either in one direction or the other by the reversible motor 3, a pinch roller 32 cooperating with the rotary capstan 33 for transporting the film. The film travels past the sound-recording head 30 which is schematically illustrated in FIG. 2 and which corresponds to the sound-recording head 21 illustrated in the circuit of FIG. 1. Thus, the sound-recording head 30 may be considered as the same unit as the sound-recording head 21 of FIG. 1. A head pad 31 cooperates with the sound-recording head 30 in a well known manner. The film 34 has not only the frames which are exposed but also a magnetic sound track on which sound is recorded at the sound-recording means. The rearward direction of travel of the film is designated by the dotted arrow shown pointing upwardly in FIG. 2.

As was indicated above the switch 17 forms a detecting means, this switch 17 operating in the manner shown in FIG. 2. Thus, the pair of film-transporting means which serve to transport the film between the exposure means 29 and the sound-recording means 30–33, act on the film in such a way as to provide therein a length sufficient to form a loop as indicated at the lower right portion of FIG. 2. This relaxed portion of the film which forms the film loop is sufficiently long to provide for continuous travel of the film at a constant speed with respect to the sound-recording means while the film can be intermittently fed to the film loop by the film-transporting means which transports the film past the exposure means 29.

As is apparent from FIG. 2 the film loop, in the illustrated example, directly engages the switch 17. In order to maintain the film loop at a predetermined magnitude, an increase or decrease in the length of the film loop beyond this predetermined magnitude will be automatically detected by the switch 17. Thus as is apparent from FIG. 2, the switch 17 is a normally open switch and will automatically assume its open position when the film loop becomes shorter than the predetermined magnitude. On the other hand, when the film loop becomes longer than the predetermined magnitude, the switch 17 will close. As a result, it is possible through the detecting means formed by the switch 17 to provide controls through the circuit means of FIG. 1 for acting on the motor 5 so as to increase the speed of rotation thereof when the film loop becomes shorter than the predetermined magnitude and decrease the speed of rotation thereof when the film loop becomes longer than the predetermined magnitude. Of course, these operations are made under the assumption that the film is travelling forwardly.

At this time, which is to say during forward travel of the film, all of the switches are in the positions illustrated in FIG. 1 where they engage those terminals whose reference characters end in a. The starting switch 1 engages the contact 1a as a result of depression of the operating plunger. As a result both of the motors 3 and 5 of the pair of film-transporting means rotate in a direction to bring about forward transport of the film. At this time the sound-recording is under the automatic control of the sound volume inasmuch as both of the switches 20 and 24 engage the terminals 20a and 24a.

The switch 17 will be opened or closed depending upon the magnitude of the film loop, as described above. Assuming that the switch 17 is closed as a result of an increase in the magnitude of the film loop beyond the predetermined magnitude, then the output voltage of the generator 14 is divided by the resistors 10 and 12 of the resistor means 10–13, so that the voltage is raised at the point a, thereby increasing the output current of the transistor 9. This latter operation results in a reduction of the output current of the transistor 8, and thus the transistor 7 serves at this time to reduce the current supplied to the motor 5. As a result the speed of rotation of the motor 5 is reduced. In this way the intermittent transport of the film is delayed effectively to an extent sufficient to reduce the magnitude of the film loop until the switch 17 assumes its normally open position. However, it will be noted that at this time electric motor 3 which drives the capstan 33 continues to rotate at a constant velocity.

As is apparent from the above description, the opening of the switch 17 results from a reduction in the length of the film loop beyond the predetermined magnitude thereof, and this opening of the switch 17 results in a drop in the voltage at the point *a*, as determined by the resistors 10, 11, and 12, all of which are rendered effective by the opening of the switch 17. Thus, the three resistors 10, 11, and 12 serve to reduce the voltage at the junction *a*, thus reducing the output current of the transistor 9 and raising the output current of the transistor 8. The result is that the transistor 7 serves to increase the current supply to the motor 5, so that the speed of rotation of the motor 5 increases and the rate of intermittent transport of the film is accelerated, thus increasing the length of the film loop.

As is apparent from the above description, the predetermined magnitude of the film loop which has been referred to is simply a reference magnitude inasmuch as during operation of the camera the switch 17 is always either opening or closing to bring about a change in the speed of operation of the motor 5. However, this continuing slight fluctuation in the magnitude of the film loop which will result from the above circuit means and detecting means 17 serves in a very effective manner to maintain a film loop of the required magnitude at the predetermined location shown at the lower right of FIG. 2. In this way there is an assurance that the constant velocity with which the film is transported past the sound-recording head is never influenced by the intermittent film transport at the exposure means.

In order to provide a fade-out operation, the change-over switch 24 is displaced away from its terminal 24*a* and into engagement with its terminal 24*b*. Now the magnitude of the audio current will depend upon the variable resistor 25 associated with the member which controls the size of the shutter angle as referred to above. As the size of the latter angle diminishes the slider of the variable resistor moves from P toward Q, shown in the upper left of FIG. 1. As a result the output of the sound-recording amplifier 19 is progressively reduced and the volume of the sound which is recorded is also reduced as the fade-out operation progresses. It is possible to provide an arrangement which will cause the audio signal to dissappear substantially when the angle of opening of the shutter is reduced to a minimum and exposure of the film is interrupted. When the angle of opening of the rotary shutter has reached its minimum value, all of the change-over switches except the switches 24, 17, and 1, as referred to above, are changed over to engage the terminals designated by the reference characters which end in *b*. At this time the change of the switch 2 so as to close at its contact 2*b* will temporarily interrupt the operation of the electric motors 3 and 5.

However, upon release of the operating plunger, the release switch 1 returns into engagement with its terminal 1*b*, and thus the electric motors 3 and 5 will now be energized but will rotate in the opposite direction corresponding to rearward or rewinding travel of the film. Thus, the film will now be rewound or in other words will be transported rearwardly, but nevertheless the predetermined magnitude of the film loop will be maintained automatically as described below.

Closure of the switch 16 at its contact 16*b* serves to short-circuit the resistor 11, while closing of the switch 15 at its terminal 15*b* enables the resistor 13 to participate in the control of the speed of motor 5 during the reverse rotation thereof. It will be seen that the switch 17 will still be closed automatically when the film loop increases in length, and therefore at this time there will be a drop in the divided voltage at the junction *a*, as determined by the circuit which includes the resistor 12 and 13 connected in parallel with each other to the resistor 10. As a result the transistor 7 will increase the current supplied to the electric motor 5, causing the latter to accelerate while rotating in the reverse direction, and in this way the magnitude of the film loop will be reduced. However, when this film loop becomes short enough to cause the switch 17 to assume its open position, the voltage at the point *a* will be determined only by the resistors 10 and 12, so that this voltage is raised in order to bring about a reduction in the speed of rotation of the motor 5, and thus the length of the film loop will increase at this time. It is to be noted that during the rearward transport of the film, the electric motor 3 still rotates at a constant velocity but in a reverse direction, so that the capstan 33 is rotated at a constant velocity in a reverse direction for continuously feeding the film to the loop from which the film travels in the rewinding direction past the exposure means, as designated by the dotted arrow in FIG. 2. Thus during this rearward travel of the film the proper maintenance of the film loop is assured.

As was pointed out above, among the switches which engage the terminals designated by reference characters ending in *b*, is the switch 20 which at this time, during rearward travel of the film, engages the terminal 20*b*, so that the recording head 30 (or 21) is inoperative and sound is not recorded during rearward travel of the film.

When a predetermined length of film has been transported rearwardly in the above manner, in preparation for a subsequent fade-in operation, all of the switches, with the exception of the switch 24, are returned to their terminals designated by reference characters ending in *a*, and thus electric motors 3 and 5 are deenergized by transfer of the switch 2 into engagement with its terminal 2*a*. However, when the operating plunger is depressed so as to start the operation of the camera, the switch 1 will be transferred to its terminal 1*a*, thus bringing about forward transport of the film and operation as referred to above. Of course, at this time the switches 15 and 16 respectively are closed at their contacts 15*a* and 16*a*, so that the detecting means formed by the switch 17 will reliably maintain the required film loop. Also, at this time the switch 20 has been returned to its teminal 20*a*, so that sound recording during forward transportation of the film can take place. However, it is to be noted that at the start of these operations the changing of the switch 20 into engagement with its terminal 20*a* serves only as providing conditions in preparation for sound recording, inasmuch as the switch 24 still remains in engagement with its terminal 24*b*, and there is no audio signal while the angle of opening at the shutter is maintained at its minimum size.

During the fade-in operation which occurs while the angle of opening of the shutter progressively enlarges upon start of the forward rotation of the electric motor 5, the slider of the variable resistor 25 travels away from end terminal Q toward the end terminal P, while the angle of opening of the shutter progressively increases, and thus the output of the sound-recording amplifier 19 also progressively increases. The volume of the sound which is to be recorded is thus progressively increased toward the normal output of the sound-recording head. Upon completion of the fade-in operation, the switch 24 returns to its terminal 24a, and then the normal photography operations and sound-recording operations proceed with automatic control of sound volume.

It is apparent, therefore, that with the above features of the invention the relaxation of the film and thus the film loop is always maintained at a predetermined magnitude irrespective of the direction of film transport and it is thus possible to bring about film rewinding operations without requiring elements such as the capstan 33 and pinch roller 32 to be displaced away from the positions which they occupy during normal sound-recording operations. This latter result is of course a great convenience and considerably simplifies the structure.

Referring now to FIGS. 3A and 3B, those components therein which correspond to those of FIGS. 1 and 2 are designated by the same reference characters. According to FIGS. 3A and 3B, the detecting means is formed by a switch means 17 which is normally closed and assumes its closed position when the film loop becomes shorter than a predetermined magnitude, while when the film loop becomes longer than the predetermined magnitude the switch 17 is displaced by the increased length of the film loop to an open position. This arrangement is clearly apparent from the lower right portion of FIG. 3A. Thus it is not essential to use a switch means 17 as shown in FIG. 2. The circuitry shown in FIG. 3B, in order to cooperate with the switch 17 of FIG. 3A, requires only that the terminals of the switches 15 and 16 be reversed with respect to the arrangement shown in FIG. 1. Thus, considering the situation where the film is transported forwardly, when the film loop increases in length beyond the predetermined magnitude, the switch 17 opens, and of course at this time the switches 15 and 16 are closed at their terminals 15 a and 16a, respectively, so that the voltage at the junction a is determined only by the resistors 10 and 12, thus bringing about a reduction in the speed of rotation of the electric motor 5. The result is that the length of the film loop diminishes and the switch 17 will then assume its closed position as the length of the film loop becomes shorter than the predetermined magnitude. The closing of the switch 17 of course will, at this time during the forward travel of the film, bring about an acceleration of the rotation of the electric motor 5 as determined by the resistances 10, 12 and 13.

Assuming now that the film is being transported rearwardly with the motors 3 and 5 being reversely rotated while the several switches as referred to above are closed at their contacts designated by reference characters ending in b, then as the film loop becomes longer and opens at the switch 17 the voltage at junction a is determined by the resistances 10, 11 and 12, so as to bring about an acceleration in the motor 5, thus causing the length of the film loop to diminish until the switch 17 again closes with the result that at this time the voltage at the point a is determined only by the resistances 10 and 12, thus bringing about a deceleration of the motor 5, which will again cause the length of the film loop to increase.

Thus, through this simple rearrangement of the switches 15 and 16 of FIG. 1 so that they will have the construction of FIG. 3B, it is possible to utilize for the detecting means an electrical switch means which has a normally closed position and which is opened by an increase in the length of the film loop, as described above.

Moreover, while in the embodiments described above the detecting means is formed by the switch means 17 which either has a closed position, it is also possible to bring about the desired results with a detecting means formed by a switch means which has one closed position when the film loop becomes longer than the predetermined magnitude and another closed position when the film loop becomes shorter than the predetermined magnitude. Such an arrangement is illustrated in FIGS. 4A and 4B where it will be seen that the switch 17, which forms the detecting means, has the form of a double-throw switch normally closed at a terminal X when the film loop becomes shorter than the predetermined magnitude, while being displaced by the film loop to a closed position engaging a terminal Z, when the film loop becomes longer than the predetermined length, the circuit being completed either through the points X and Y or through the points Y and Z, as is apparent from FIGS. 4A and 4B. It will be noted that with the embodiment of FIGS. 4A and 4B the resistance 11 and the switch 16 are not required. Assuming that the film is travelling forwardly, then the switch 15 is closed at its terminal 15a, as shown in FIG. 4B, and when the film loop becomes longer than the predetermined length, the detecting means 17 will be closed at its terminal Z, thus bringing about at this time a voltage at the junction a determined only by the resistors 10 and 12, so that the motor 5 is decelerated to reduce the length of the film loop. When the film loop becomes short enough to cause the detecting means 17 to become closed at its terminal X, then the voltage at a will be determined by all three resistors 10, 12, and 13, so that the circuit will have the position shown in FIG. 4B and the motor 5 will be accelerated.

However, during rearward transportation of the film, the motor 5 will be accelerated when the relaxation of the film increases to increase the length of the film loop and decelerated it when the relaxation of the film is reduced so as to cause the film loop to become shorter. These operations are apparent from the circuitry of FIGS. 4A and 4B and the above description.

Referring now to FIGS. 5A and 5B, the detecting means 17 is identical with that of FIG. 4A, but the circuitry has a different construction according to which the resistance 13 and switch 15 are omitted and instead the resistance 11 and switch 16 are included. Thus, as is apparent from FIG. 5B, during forward travel of the film when the switch 16 is closed at its contact 16a, closing of the detecting switch 17 and its contact X will cause the resistor 11 to operate in the circuit while closing of the switch 17 at its contact Z will eliminate the effect of the resistor 11, so that in this way the speed of the motor 5 is controlled during forward travel. On the other hand, when the switch 16 is closed at its contact 16b, during rearward travel of the film, closing of the switch 17 at its terminal X will eliminate the effect of resistor 11 from the circuit while closing of the switch 17 at its terminal Z will render the resistor 11 effective, so that the speed of the motor 5 will be properly controlled as referred to above.

Referring now to FIGS. 6A and 6B, a particularly practical application of the present invention is disclosed therein. It will be noted that in FIG. 6A the detecting means 17 also is identical with the detecting means 17 of FIGS. 4A and 5A. However, with this embodiment the detecting means is directly connected electrically with the motor 5 in the manner shown in FIG. 6B with the motor 5 being a mechanically governed motor while the connections of the switch 17 for forward and rearward travel are controlled by the switch 15 as illustrated. Thus, as is apparent from FIG. 6B, during forward travel when the switch 15 is closed at a terminal 15a, the switch 17 in effect forms a simple switch similar to that of FIG. 3A which is normally closed and which assumes its closed position when the film loop becomes shorter than a predetermined length and which is opened by the film loop when it becomes longer than a predetermined length. As is apparent from FIG. 6B, during forward travel of the film when the switch 15 is in the position illustrated, opening of the switch 17 at its terminal X will bring about a reduction in the speed of the motor 5, so that the length of the film will decrease, while on the other hand a reduction in the length of the film loop will enable the switch 17 to assume its closed postion shown in FIG. 6B, causing the motor 5 to accelerate and increase the length of the film loop.

On the other hand, during rearward travel of the film when the switch 15 is closed at its contact 15b, the terminal X is rendered ineffective and the switch 17 of FIGS. 6A and 6B becomes the equivalent of the switch 17 of FIG. 2 in that the switch is the same as a normally open switch which becomes closed when the film loop increases in length and which opens when the film loop becomes shorter than the predetermined magnitude. Thus, at this time, during rearward transportation of the film, when the film loop becomes longer than the predetermined magnitude so as to close the switch 17 at its terminal Z, the speed of the motor 5 will increase and the film loop will become shorter. On the other hand, during rearward travel of the film when the film loop becomes short enough to open the switch 17 at its terminal Z, the motor 5 will decelerate and the length of the film will increase. Thus through the simple arrangement of FIGS. 6A and 6B it is also possible to control very effectively the length of the film loop.

Thus, as is apparent from the above description, the extent of film relaxation between the exposure means and sound-recording means is always maintained at a predetermined magnitude independently of the direction of film travel, and as a result it is possible to rewind the film without displacing away from the film any sound-recording components which engage the film during forward transportation thereof. Moreover, the recording of sound can be interrupted by interrupting the input to the sound-recording head during film rewinding, so that the sound-recording mechanism used with the camera of the invention can have components which remain at a predetermined location at all times, thus achieving considerable advantage with respect to design and manufacture of the sound-recording mechanism.

It is to be noted that although in all of the above-described embodiments the switch means 17 is located at the outside of the film loop to be displaced from the position which it normally assumes by an increase in the length of the film loop, it is also possible to situate the switch 17 inside the film loop to be displaced from the position which it normally assumes by a decrease in the length of the film loop. Of course, with such a change the operation of the switch will be reversed with respect to the description thereof provided above.

Furthermore, it is apparent that although in the description above, and in the drawings, it is the film-transport means which transports the film past the exposure means 29 which has the variable speed motor 5 for controlling the length of the film loop, it is also possible to provide, in accordance with the invention, a construction according to which the motor 5 rotates at a constant speed and the motor 3 is the variable speed motor which has its speed regulated in order to maintain a predetermined length of film loop. For this purpose all of the above controls need only apply to the motor 3 rather than to the motor 5 which in this case can rotate at a constant speed. Thus, with such an arrangement, during forward travel of the film the circuitry operates automatically to increase the speed of the motor 3 upon an increase in the length of the film loop while the speed of the motor 3 will be decreased upon a decrease in the length of the film loop. On the other hand, during rearward travel of the film, with such an arrangement, during an increase in the length of the film loop the motor 3 is decelerated and during a decrease in the length of the film loop the motor 3 is accelerated.

Furthermore, with detecting means as described above where a switch directly contacts the film to be controlled thereby, the contact between the switch and the film is preferably at the side of the film which is opposed to the exposed surface where the emulsion is located, so that in this way the exposed surface of the film is not damaged by the detecting means. Furthermore, although a mechanical switch type of detecting means has been described above, it is also possible to use a photosensitive arrangement according to which the film loop when increasing and decreasing in length can move with respect to a light beam, for example, so as to bring about the required controls. Thus a suitable photosensitive element such as a photocell may be arranged to receive light from a suitable source when the film loop is shorter than a predetermined magnitude with the light travelling to the photocell being interrupted when the film loop becomes longer than the predetermined magnitude, and in this way such a photocell may be used to bring about the required controls, although in this case also a reverse arrangement is possible where the light beam travelling to the photocell can be interrupted when the film loop becomes shorter than a given length with the light beam not being interrupted when the film loop becomes longer than a predetermined length.

It is thus apparent that variations in the specific structure described above and shown in the drawings are possible in order to bring about the desired results of the present invention.

What is claimed is:

1. In a sound-recording motion-picture camera, exposure means for exposing film as the latter is fed in a forward direction frame-by-frame in a stepwise manner past said exposure means, sound-recording means for receiving exposed film which travels in said forward direction beyond said exposure means and for recording sound on a sound track of said film while the latter travels in a continuous manner past said sound-recording means, a pair of reversible film-transporting means respectively situated in the regions of said exposure means and sound-recording means for transporting the film both forwardly with respect to said exposure means and sound-recording means, respectively, and rearwardly with respect to said exposure means and sound-recording means, respectively, while maintaining between said exposure means and sound-recording means a length of film sufficiently great to provide in the film between said exposure means and sound-recording means, at a predetermined location, a relaxed film loop from which the film can travel continuously to said sound-recording means while being fed in said forward direction to said predetermined location in a stepwise manner from said exposure means, and at least one of said film-transporting means including a variable speed electric motor, for determining the speed with which film is transported by said one transporting means, detecting means for cooperating with the film loop at said predetermined location for detecting when the film loop becomes longer or shorter than a predetermined magnitude, said detecting means including a switch means situated at said predetermined location for directly engaging the film loop and for responding to a change in the length of the film loop, said switch means having one position when the film loop increases in length beyond said predetermined magnitude and another position when the film loop decreases in length beyond said predetermined magnitude, and electrical circuit means operatively connected with said detecting means for responding automatically to movement of said switch means thereof between said positions and electrically connected with said variable speed motor of said one transporting means for automatically changing, when said switch means changes its position, the speed of said motor, during forward and rearward travel of the film, to increase the length of the film loop when the latter becomes shorter than said predetermined magnitude and for decreasing the length of the film loop when the latter becomes longer than said predetermined magnitude, said electrical circuit means including an electrical amplifying means electrically connected with said variable speed electric motor of said one film-transporting means, said amplifying means having an input, generator means for generating an input voltage to be transmitted to said input, and electrically connected between said generator means and amplifying means a plurality of resistors electrically connected with said switch means of said detecting means to be controlled by the latter switch means for determining the input voltage received by said input of said amplifying means, said plurality of resistors including a plurality of separate, discrete resistors and said switch means being connected together with said plurality of discrete resistors between said generator means and amplifying means for changing the number of said plurality of discrete resistors effectively connected electrically between said generator means and amplifying means when said switch means changes between said positions thereof, for determining said input voltage in accordance with the number of resistors rendered effective by said switch means.

2. The combination of claim 1 and wherein said sound-recording means includes components which engage the film during forward movement thereof and which have during rearward movement of the film the same position with respect thereto as during forward movement of the film.

3. The combination of claim 2 and wherein said sound-recording means includes a recording head and said circuit means including a switch means electrically connected with said recording head for rendering the latter operative during forward movement of the film and inoperative during rearward movement of the film.

4. The combination of claim 1 and wherein said positions of said switch means are respectively open and closed positions.

5. The combination of claim 1 and wherein said switch means has a pair of contacts through which said switch means is respectively closed in said positions.

6. The combination of claim 1 and wherein said one film transporting means is the transporting means which feeds the film past said exposure means.

7. The combination of claim 1 and wherein said sound-recording means includes a variable resistor means for automatically reducing the volume of sound during a fade-out operation and increasing the sound volume during a fade-in operation and switch means for rendering said variable resistor means operative only during a fade-out or a fade-in operation.

* * * * *